(12) United States Patent
Carlesimo et al.

(10) Patent No.: US 9,878,662 B2
(45) Date of Patent: Jan. 30, 2018

(54) METHOD AND SYSTEM FOR SMART VEHICLE LIGHTING

(71) Applicant: GM GLOBAL TECHNOLOGY OPERATIONS LLC, Detroit, MI (US)

(72) Inventors: Daniel P. Carlesimo, Rochester, MI (US); Marcelo V. Lazarini, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 31 days.

(21) Appl. No.: 14/816,785

(22) Filed: Aug. 3, 2015

(65) Prior Publication Data

US 2017/0036597 A1 Feb. 9, 2017

(51) Int. Cl.
*B60Q 3/00* (2017.01)
*B60Q 3/78* (2017.01)

(52) U.S. Cl.
CPC ..................... *B60Q 3/78* (2017.02)

(58) Field of Classification Search
CPC B60Q 1/2665; B60Q 1/2669; B60Q 2400/40; B60Q 1/2619; B60Q 1/2696; B60Q 3/0293; B60Q 3/78
See application file for complete search history.

(56) References Cited

U.S. PATENT DOCUMENTS

| 2014/0133545 | A1* | 5/2014 | Ploix | G05B 19/0423 375/238 |
| 2014/0347164 | A1* | 11/2014 | De Wind | B60Q 1/2619 340/5.72 |

* cited by examiner

*Primary Examiner* — Curtis Odom
(74) *Attorney, Agent, or Firm* — Mickki D. Murray; Parks IP Law LLC

(57) ABSTRACT

Provided are methods and systems for smart backlighting. For example, there is provided a system for use with a vehicle. The system includes a primary subsystem configured to perform a first function. Further, the system includes a backlight subsystem configured to perform a second function, the second function being independent of the first function. Moreover, the system can includes a controller configured to generate a single signal including a first instruction for causing the primary subsystem to perform the first function and a second instruction for causing the backlight subsystem to perform the second function.

17 Claims, 3 Drawing Sheets

100

200

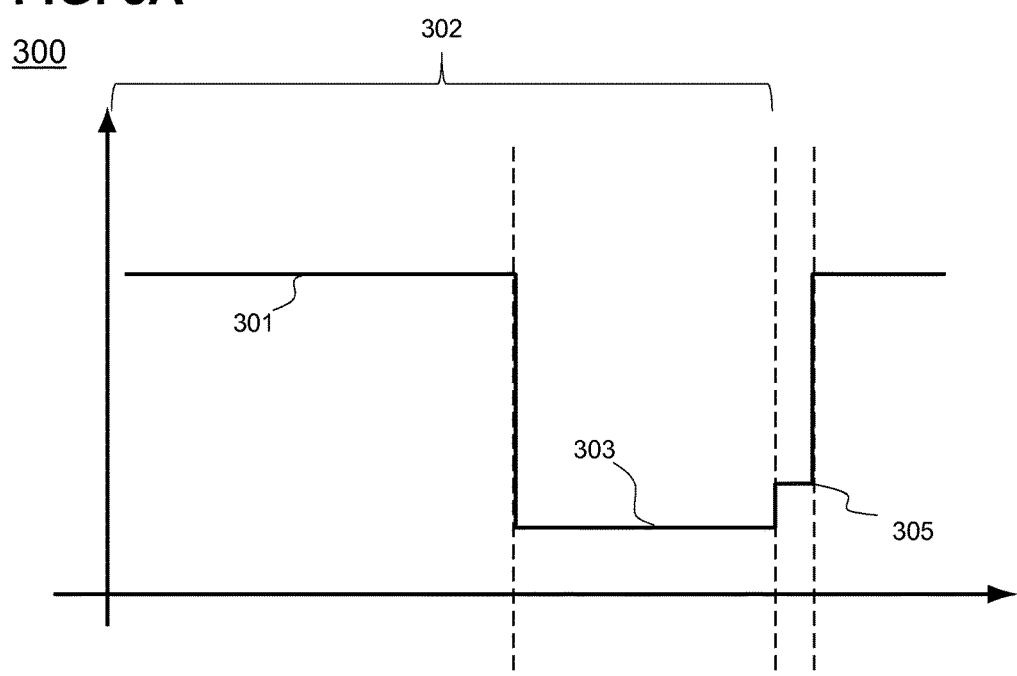
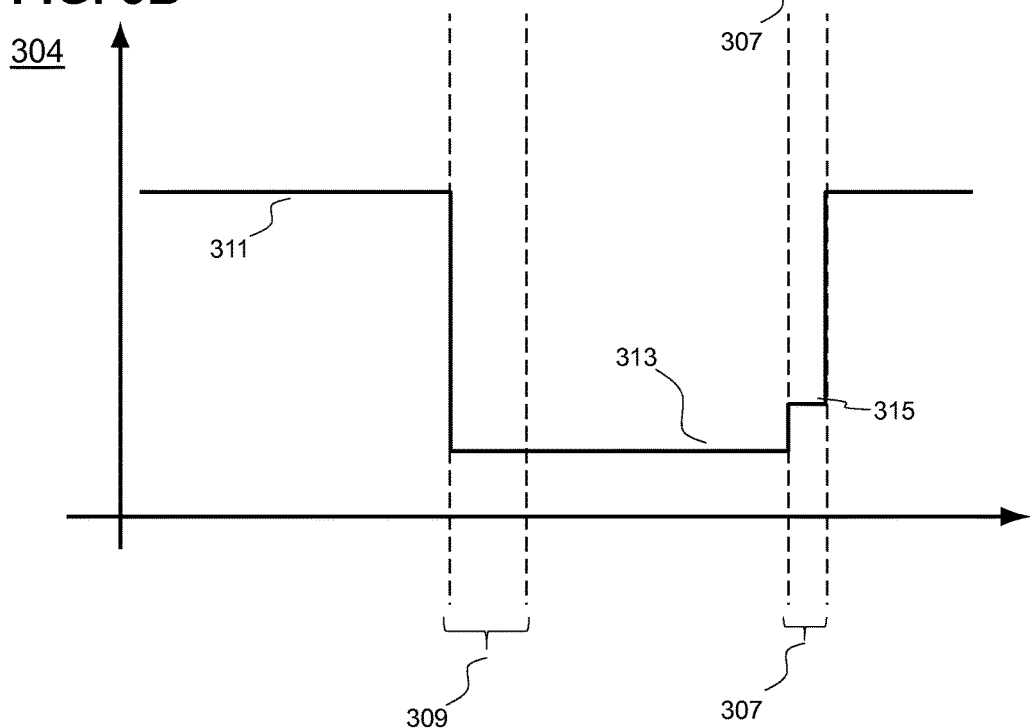

400

500

METHOD AND SYSTEM FOR SMART VEHICLE LIGHTING

TECHNICAL FIELD

The present disclosure relates generally to backlight systems and, more particularly, to smart backlight systems integrated efficiently with other systems, such as other vehicle systems.

BACKGROUND

A primary means for reducing production costs of a product is to reduce the number of components it includes. Often times, however, this cannot be done without compromising functionality. Reports indicate that eliminating functionality may eventually result in loss of market share due to reduced consumer satisfaction.

As such, a design paradigm that seeks to reduce cost must do so without compromising functionality. This is particularly true for backlight systems. A backlight system is a lighting system configured to illuminate items, such as keys or switches that a user routinely interacts with on a machine or in a vehicle. In typical backlight systems, particularly for vehicles, complex interactions between switches and other subsystems have made component reduction thus far impossible without sacrificing functionality.

Therefore, in vehicles that include simplified backlight system designs, for example, while productions costs for the manufacturer are lowered, consumers have reduced functionality. As such, there is a need to provide backlight systems having fewer parts, with no loss of functionality, and in some cases, even more functionality than what is currently available.

SUMMARY

The embodiments featured herein help solve or mitigate the above-noted issues as well as other issues known in the art. This disclosure provides a smart backlight system that combines backlight features into existing circuit already required to perform a device's primary functionality. The embodiments can be implemented using a software state diagram to execute all features and functionalities of both the backlight system and the primary functionalities of other systems.

In one embodiment, there is provided a system for use with a vehicle. The system includes a primary subsystem configured to perform a first function. Further, the system includes a backlight subsystem configured to perform a second function, the second function being independent of the first function. Moreover, the system includes a controller configured to generate a single signal including a first instruction for causing the primary subsystem to perform the first function and a second instruction for causing the backlight subsystem to perform the second function.

In another embodiment, there is provided a method for use with a vehicle. The method includes triggering an execution of a first operation by a primary subsystem of the vehicle. Further, the method includes triggering an execution of a second operation by a backlight subsystem of the vehicle. Furthermore, in the provided method, triggering the execution of the first operation and triggering the execution of the second operation are achieved by a circuit common to both the primary subsystem and the backlight subsystem.

In yet another embodiment, there is provided a system for use at a vehicle. The system includes a primary subsystem configured to perform a first function and a backlight subsystem configured to perform a second function, the second function being independent of the first function. Furthermore, the system includes circuitry common to both the primary subsystem and the backlight subsystem. The circuitry is configured to instruct the primary subsystem to perform the first function and the backlight subsystem to perform the second function.

While this disclosure describes the present technology primarily in connection with backlighting, and particularly with respect to backlight in a vehicle environment, the technology is not limited in these ways. Features other than or along with backlighting may be a base for the technology, such as audible tones. A vehicle may provide a peaceful welcome chime in response to being unlocked. And the technology can be implemented in other environments, for instance, to aircraft, marine craft, and non-vehicle systems, such as elevators, building doorways, etc.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

FIGS. 3A and 3B are timing diagrams according to exemplary embodiments.

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility. For example, the teachings disclosed herein may be practiced in applications where backlight systems, keys, and switches are generally used, such as in computer keyboards, cell phone keyboards and the like.

Figure 1:
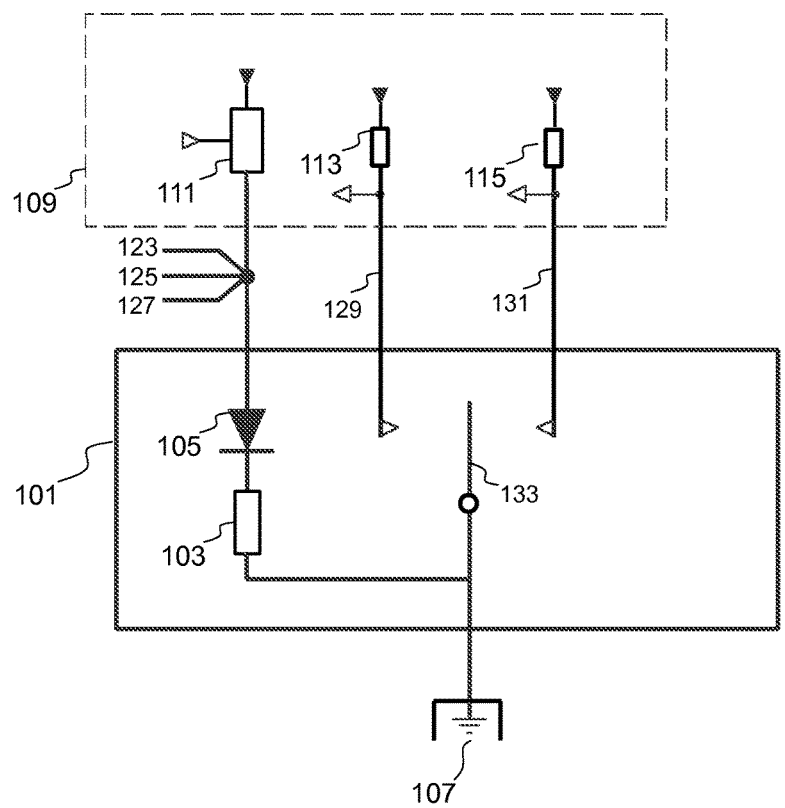
FIG. 1 is an illustration of a typical system associated with a vehicle.

FIG. 1 is an illustration of a system 100 according to the related art. The system 100 includes a first module 101 and a second module 109. The first module 101 includes a single-pole double-throw switch formed by lines 133, 129, and 131. The line 133 is grounded at terminal 107. Generally speaking, terminal 107 can represent a switch case ground or a ground provided by an external circuit. Furthermore, the first module 101 includes a light emitting diode (LED) 105 that can be configured to emit light at a certain level based on a selected backlight mode.

Biasing of the LED 105 is achieved using a load 103 in the first module 101 and a backlight driver 111 in the second module 109. Lines 123, 125, and 127 are leads that extend to other loads that make up the backlight subsystem; these loads may be LEDs like the LED 105, and they may be part of other first modules like the first module 101. These other first modules can include one or more switches associated with various primary subsystems of the vehicle.

For example, and not by limitation, the system 100 can be used with a lock/unlock mechanism for a vehicle's door. The line 129 may be dedicated to activating a locking mechanism and the line 131 can be dedicated to activating an unlocking mechanism. The components 113 and 115 can be configured to instruct the lock/unlock mechanism (not shown) to perform the desired operation. Generally speaking, system can be used for any vehicle subsystem. It is noted that in the context of this disclosure, a vehicle subsystem is any subsystem other than the backlight system. The vehicle subsystem has primary functions that are particular to it and distinct from functions carried out by the backlight system. As such, the vehicle subsystem may be referred to hereinafter as a primary subsystem of the vehicle, to further distinguish it from the backlight system As shown in FIG. 1, in the system 100, primary functions (e.g. unlocking/locking) are decoupled from the backlighting functions provided by the LED 105 and its associated circuits (103, 111). As such, the system 100 of FIG. 1 has more parts, and requires more complex and separate controls to achieve primary functions and backlighting functions, relative to the systems of the present technology.

Figure 2:
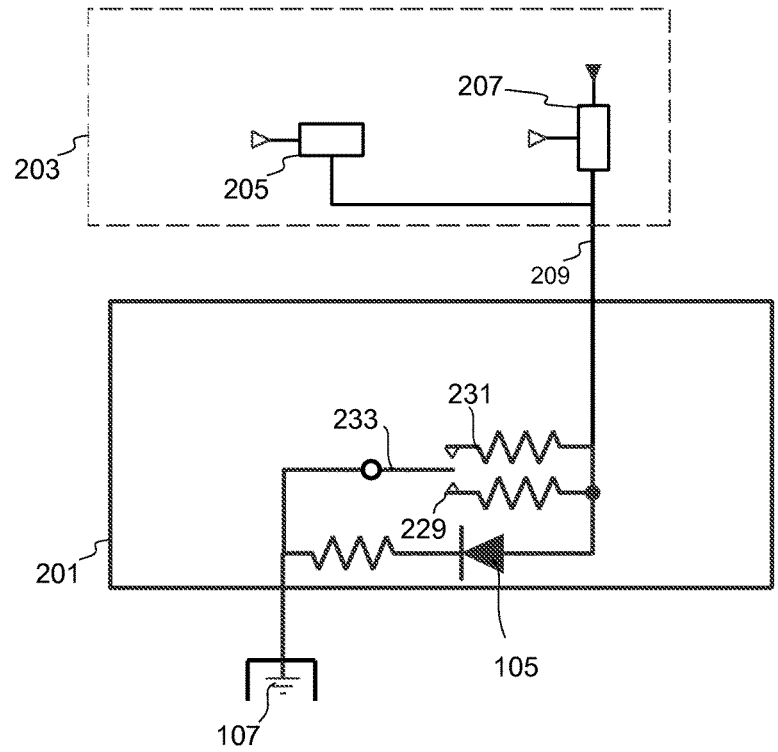
FIG. 2 is an illustration of a system according to an exemplary embodiment.

FIG. 2 is an illustration of a system 200 according to an exemplary embodiment. Unlike the system 100 of FIG. 1, the system 200 of FIG. 2 includes very few parts and accomplishes primary functions as well as backlighting functions using fewer components and using generally or completely the same electronic circuitry, even though the primary functions and backlight functions are independent from each other. As such, the system 200 can be manufactured with a lesser cost without sacrificing functionality. Further, the system 200 can be within the vehicle, i.e. it may be mounted on an inner panel of the vehicle. In other embodiments, however, the system 200 can be part of a remote controller that can communicate with a vehicle subsystem wirelessly.

The system 200 includes a first module 201 and a second module 203. The first module 201 includes a single-pole double-throw (SPDT) switch formed by lines 233, 229, and 231. An SPDT switch as described is only one type of switch that can be used in the embodiments. Other switch configurations, like single-pole single-throw, single-pole triple-throw, and the like, are also contemplated. Generally speaking, any switch, button, key, or the like can be used with the system 200. The circuit formed by the first module 201 and the second module 203 are grounded at the ground terminal 107. As in the case of the system 100 of FIG. 1, the ground terminal 107 can be a switch case ground or a ground provided by an external circuit.

In the second module 203, common electronic circuitry is configured to provide primary functions as well as backlighting functions. The common electronic circuitry includes an analog-to-digital converter (A/D) 205 and a pulse-width modulator (PWM) 207. Depending on which one of lines 231 and 229 is activated, the A/D 205 and the PWM 207 function cooperatively to provide an instruction signal for carrying out a primary function.

For example, and not by limitation, when the switch is in a position so that line 233 bridges with line 231, a signal on line 209 can carry an instruction configured to cause an unlocking/locking subsystem (i.e., a primary vehicle subsystem) to lock a door. Conversely, when lines 233 and 229 are bridged, the signal on line 209 includes an instruction configured to cause the unlocking/locking subsystem to unlock the door. It is noted that while only the primary subsystem performing unlocking/locking is described herein in reference to the system 200, other primary vehicle subsystems are contemplated. For example, the system 200 can include one or more switches related to releasing a trunk, activating an electronic stability control system, or deactivating the electronic stability system.

In system 200, while the signal on line 209 carries information associated with primary functions, the signal on line 209 can include information related to the backlighting subsystem. Specifically, the single signal includes a first instruction or other information configured to instruct subsystems (not shown) whose operations may depend on system 200. These subsystems may use the signal on line 209 to perform primary functions indicated by positioning of the switch—i.e., whether line 229 or 231 is selected. The single signal can also include a second instruction or other information configured to activate the LED 105 according to a specific backlighting mode.

For example, as in the case of the typical system 100 described above, the signal on line 209 can include a first instruction configured to instruct a door locking/unlocking mechanism to engage or release the door lock. However, in the system 200, the same signal includes the instructions or indications to both instruct the door locking/unlocking mechanism and place the LED 105 into a corresponding backlight mode. In this example, while the backlight functions are independent of the primary functions—e.g., unlocking/locking functions—all of these relevant functions are all controlled by the same common circuitry (i.e., the A/D 205 and the PWM 207). It is noted that the A/D 205 and the PWM 207 can be part of a controller, microcontroller, or processor. An exemplary signal consistent with the embodiment shown in FIG. 2 is described below in the context of FIGS. 3A and 3B.

FIG. 3A is a timing diagram indicating how a single signal 300 can be used to trigger primary functions as well as backlight subsystem functions, according to an embodiment. It is noted that the encoding scheme shown in FIG. 3A is merely exemplary. Any scheme that encodes instructions or information related to both backlight system functionality and primary functionalities on the same signal is contemplated.

In this exemplary embodiment, the signal 300 is periodic and only one of its periods is shown in FIG. 3A for clarity. Further, the signal 300 includes two portions, a first cycle 301, a second cycle 303, forming a first portion 302 and reserved for encoding the instruction for the backlight mode, and a second portion 305 that is reserved for the primary function(s) associated with the system 200.

For example, in an embodiment, during an operation of system 200, first and second cycles 301 and 303 can be used to activate the LED 105. The duration and the intensity at which LED 105 is activated can be controlled by adjusting the relative lengths of the first cycle 301 with respect to the second cycle 303. In other words, a duty cycle of signal 300 can be used to select and control a particular backlighting mode. The second portion 305 is reserved for instructing primary subsystems to perform their respective functions, which are independent of the backlight system functions. Specifically, the primary functions are executed during a reserved read time 307 during the cycle of signal 300. In this example embodiment, the analog level of the signal during read time 307 can be used to encode the command for a specific primary functions to be executed.

As shown in FIG. 3B, different backlighting modes can be achieved by varying the duty cycle of signal 300. This is shown in signal 304 which is similar to signal 300 except that the duty cycle of the signal is changed to reflect a different backlight mode. The change in duty cycle is indicated by a time difference 309. This indicates that, on average, per each cycle, the LED 105 will remain in an ON state for a shorter period of time than if the signal 300 of FIG. 3A was used.

Figure 4:
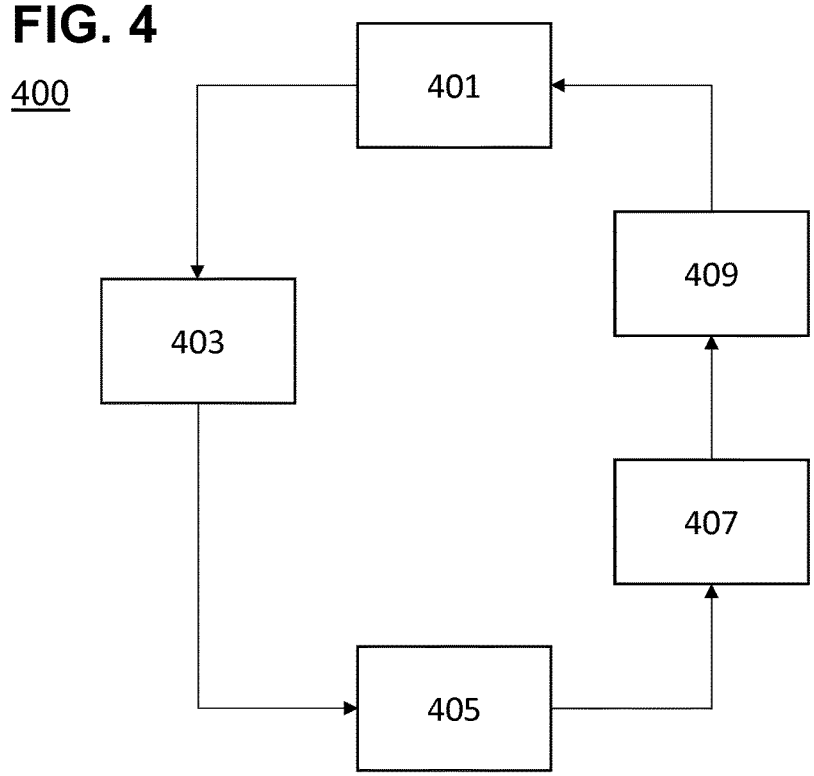
FIG. 4 is a state diagram according to an exemplary embodiment.
Figure 5:
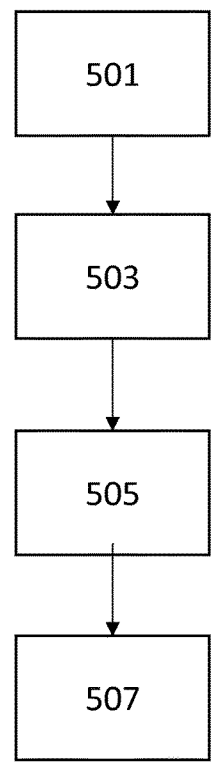
FIG. 5 is a flow chart depicting a method according to an embodiment.

In the previous examples, while backlight functions were described as being independent of the primary functions, in other example embodiments, a primary function can trigger a specific backlight function to be executed. For example, opening a door of the vehicle can cause the backlight subsystem to enter a specific mode. This functionality may be accomplished using a system like the system 200 of FIG. 2 and using a software state diagram. FIG. 4 illustrates an exemplary software state diagram for an example application that interrelates at least one primary subsystem function and at least one backlight subsystem function.

The state 401 represents an initial state of the backlight system. For example, the state 401 may be a power "OFF" state, meaning that the backlight system is not on. Upon the actuation of a switch, or an input signal from a sensor, a transition from an initial state 401 may be triggered. For example, a door may open, thereby instructing a system like system 200 to unlock all other doors in addition to putting the backlight system in a mode consistent with a door being opened. Once the transition is triggered, the system may ramp up the backlight system to a maximum level. This may be done by gradually varying the duty cycle of a signal like the signal 300 of FIG. 3A. For example, and not by limitation, this "ramp-up" state 403 can be achieved by gradually increasing the duty cycle of the signal. Once the backlight system is at its maximum level, the backlight system moves from state 403 to state 405, where it is in a particular mode, such as a welcome mode. The welcome mode can be pre-programmed to cause the backlight system to stay on at a constant intensity level for a pre-determined duration of time corresponding to an amount of time that a driver typically takes to enter and become settled in the vehicle.

After the pre-determined duration of time has elapsed, the backlight system switches to a new state 407 in which a countdown begins. Once the countdown has elapsed, the backlight system enters a ramp-out state 409, in which the light gradually fades. This effect can be achieved by gradually decreasing the duty cycle of the signal, i.e., in a manner contrary to what was done in the ramp-up state 403. The backlight system then returns to its initial state 401.

The state diagram 400 is only an example, and other scenarios can be implemented without departing from the scope of this disclosure. For clarity and to further illustrate the smart backlighting capabilities provided by the present disclosures, several backlight modes are described below.

Certain aspects of the backlight system may or may not be allowed, depending on the vehicle's power mode. Furthermore, a dimmer switch can allow a vehicle's occupant to control the intensity of the displays and of backlighting. The switching system can determine when and if dimming is allowed based on inputs from the power mode, a surveillance switch, an ambient light sensor, the state of the park lamps and that of the dimmer control.

Another mode can be a "parade mode," which maintains the day level of illumination for the LED backlit switches when the park lamps are illuminated in day ambient light conditions. Moreover, the "night-panel" feature can provide an occupant with the ability to set all the vehicle displays to the legal minimum allowed (by pressing a night-panel switch).

The welcome mode illuminates the switches' backlights to welcome the driver. This feature operates in the OFF power mode and may be activated by a driver opening a door of the vehicle. In the "premium dimming" mode, the system allows for the continuous monitoring of the ambient light sensor to continuously control the dimming of the backlighting, which is only illuminated and dimmable by the occupant when the park lamps are on. Furthermore, in a police surveillance mode, which is independent of the power mode, the system can disable all or some automatic interior lighting functions, including switch backlighting whenever a surveillance mode switch is actuated.

Furthermore, for vehicular applications, primary functions can include, but are not limited to, releasing a trunk, locking a door, unlocking the door, activating an electronic stability control system, and deactivating the electronic stability system. Each of these primary functions can have a specific backlight mode associated thereto which can be triggered when these primary functions are engaged.

Moreover, while switches associated with triggering backlight subsystem functions are not shown in FIG. 2, it is to be understood that backlight modes can be selected based on actuation of a switch, much like the primary functions can be triggered by actuating a switch. The backlight switches are as such, backlight adjustment inputs, and they can include at least one of an ignition switch, a dimmer control switch, a headlamp/park lamp switch, a night-panel request switch, a surveillance switch. Alternatively, a specific backlight mode can be selected based on a current level or voltage level of light sensor, such as an ambient light sensor. This list of adjustment inputs provided above is not exhaustive and any backlight subsystem adjustment input can be implemented.

Having covered the structure of several exemplary embodiments, a method 500 of operation consistent with those embodiments is now discussed. The method 500 begins at step 501. While step 501 is referred to herein as a "beginning" step, one of ordinary skill in the art will readily appreciate that method 500 may be part of a more general method associated with one or more subsystems of the vehicle, at which point step 501 is merely a transitional point. Moreover, one or more steps presented may not be performed, one or more steps can be added, and the presented order of steps can be changed.

The method 500 continues to step 503 which includes generating by a system, such as any of those described above, a first instruction or first indication. The first instruction is generated upon actuation of the switch included in the system or upon a signal received from a sensor. The first instruction that is generated is associated with the function for which the system is intended. For example, and not by limitation, if the system is designed for triggering locking or unlocking of a vehicle's door, the first instruction will be an instruction that is configured to instruct subsystems of the vehicle that activate/deactivate the door locking mechanism to react, depending on the position of the switch. For example, and not by limitation, the first instruction can be represented as a voltage change during a specified portion of an instruction signal generated by the system.

The method 500 further includes a step 505 in which a second instruction or first indication is generated. The second instruction is associated with the backlight system, and it is represented into the same instruction signal carrying the first instruction, as explained above. For example, the second instruction can be associated with placing the backlight system of the vehicle in a welcome mode. In some embodiments, the backlight subsystem function can be independent of the function associated with the first instruction. In other embodiments, however, as illustrated in FIG. 4, the backlight subsystem function can be triggered in response to the first function having occurred, or in response to the execution of the first function being triggered.

The method 500 can be repeated or end at step 507. As stated above with respect to step 501, step 507 can be a transitional point rather than an ending point. For example, after step 507, the method 500 can further include placing the backlight system of the vehicle in another mode of operation following the welcome mode. The other mode of operation can be triggered as a result of input data from other systems, sensor systems, or it may be pre-programmed to occur automatically after a welcome mode. One of skill in the art will readily recognize that the modes of operation that are selected can vary depending on the system that is used and that method 500 is not limited to any particular mode or system described herein.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A system, for implementation as part of a vehicle of transportation, comprising:
   a first vehicle subsystem configured to perform a first, vehicle, function;
   a second vehicle subsystem configured to perform a second, vehicle lighting-activation, function being independent of the first, vehicle, function; and
   a vehicle controller configured to generate a single signal including (i) a first instruction for causing the first subsystem to perform the first, vehicle, function and (ii) a second instruction for causing the second subsystem to perform the second, vehicle lighting-activation, function;
   wherein the first, vehicle, function is selected from a group consisting of activating an electronic stability control system and deactivating the electronic stability system.

2. The system of claim 1, wherein the second, vehicle lighting-activation, function includes placing the second subsystem in a backlight mode.

3. The system of claim 2, wherein the backlight mode is selected from a group consisting of a night-panel mode, a police-surveillance mode, and a parade mode.

4. The system of claim 1, wherein the vehicle controller is configured to generate the single signal in response to actuation of a switch.

5. The system of claim 1, wherein the vehicle controller is configured to generate the first instruction and the second instruction in response to actuation of a switch.

6. The system of claim 4, wherein the switch is selected from a group consisting of an ignition switch, a head-lamp switch, a park-lamp switch, a surveillance switch, and a night-panel request switch.

7. The system of claim 1, wherein the second vehicle subsystem is configured to perform the second, lighting-activation, function in response to the single signal and based on a light-sensor signal originating from a vehicle light sensor.

8. The system of claim 1, wherein the controller includes an analog-to-digital converter circuit and a pulse width modulator circuit.

9. The system of claim 1, wherein the single signal includes a first portion dedicated to the first instruction and a second portion dedicated to the second instruction.

10. The system of claim 1, wherein the second instruction is represented as a duty cycle and the first instruction is represented as a corresponding analog level.

11. The system of claim 10, wherein the duty cycle is variable, corresponding to various backlight modes.

12. The system of claim 10, wherein the analog level is variable, corresponding to various first, vehicle, functions.

13. A method, for implementation at a vehicle of transportation, comprising:
   generating a single signal comprising (i) a first instruction for causing a first vehicle subsystem to perform a first, vehicle, function and (ii) a second instruction for causing a second vehicle subsystem to perform a second, vehicle lighting-activation, function; and
   triggering, using the single signal, execution of both the first, vehicle, function by the first vehicle subsystem and the second, vehicle lighting-activation, function by the second vehicle subsystem of the vehicle;
   wherein the first, vehicle, function is selected from a group consisting of activating an electronic stability control system and deactivating the electronic stability system.

14. The method of claim 13, wherein:
   the second operation includes placing the second vehicle subsystem in a backlight mode; and
   the backlight mode is selected from a group consisting of a night-panel mode, a police-surveillance mode, and a parade mode.

15. A system, for implementation as part of a vehicle of transportation, comprising:
   a first vehicle subsystem configured to perform a first, vehicle, function;
   a second vehicle subsystem configured to perform a second, vehicle lighting-activation, function being independent of the first, vehicle, function; and
   vehicle circuitry common to both the first vehicle subsystem and the second vehicle subsystem;
   wherein the vehicle circuitry is configured to generate a single signal configured to instruct the first vehicle subsystem to perform the first, vehicle, function and the second vehicle subsystem is configured to perform the second, lighting-activation, function; and
   wherein the first, vehicle, function is selected from a group consisting of activating an electronic stability control system and deactivating the electronic stability system.

16. The system of claim 15, wherein the single signal includes a first portion for initiating the first, vehicle, function and a second portion for initiating the second, vehicle lighting-activation, function.

17. The system of claim 15, wherein:
 the second function includes placing the second subsystem in a backlight mode; and
 the backlight mode is selected from a group consisting of a night-panel mode, a police-surveillance mode, and a parade mode.

* * * * *